US009342842B2

(12) United States Patent
Sanghavi et al.

(10) Patent No.: US 9,342,842 B2
(45) Date of Patent: May 17, 2016

(54) CONTEXT-SWITCHING TAXONOMY FOR MOBILE ADVERTISEMENT (71) Applicant: Apple Inc., Cupertino, CA (US)

(72) Inventors: Mehul K. Sanghavi, Sunnyvale, CA (US); Michael Froimowitz Greenzeiger, Sunnyvale, CA (US); Ravindra Phulari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 13/854,462

(22) Filed: Apr. 1, 2013

(65) Prior Publication Data
US 2014/0297407 A1    Oct. 2, 2014

(51) Int. Cl.
*G06Q 30/00* (2012.01)
*G06Q 30/02* (2012.01)

(52) U.S. Cl.
CPC ........ *G06Q 30/0255* (2013.01); *G06Q 30/0249* (2013.01); *G06Q 30/0267* (2013.01); *G06Q 30/0269* (2013.01); *G06Q 30/0277* (2013.01)

(58) Field of Classification Search
CPC .......... G06Q 30/0251; G06Q 30/0255; G06Q 30/0267; G06Q 30/0269; G06Q 30/0277
USPC ........... 705/14.49, 14.53, 14.64, 14.66, 14.73
See application file for complete search history.

(56) References Cited

U.S. PATENT DOCUMENTS

| | | | | |
|---|---|---|---|---|
| 5,530,902 A * | 6/1996 | McRoberts | ............. | G06F 13/30 370/389 |
| 5,740,549 A * | 4/1998 | Reilly | ................ | G06Q 30/0243 705/14.42 |
| 6,339,438 B1 * | 1/2002 | Bates | ..................... | G06Q 30/02 715/787 |
| 6,807,558 B1 * | 10/2004 | Hassett | ............. | G06F 17/30867 707/999.007 |
| 7,155,508 B2 * | 12/2006 | Sankuratripati | ....... | G06Q 30/02 709/224 |
| 7,284,008 B2 * | 10/2007 | Henkin et al. | | |
| 7,299,195 B1 * | 11/2007 | Tawakol et al. | ............ | 705/14.71 |
| 7,379,976 B2 * | 5/2008 | Huat | .................... | G06Q 10/107 709/217 |
| 7,424,409 B2 * | 9/2008 | Ben-Gal | ................ | G06Q 40/04 341/107 |
| 7,493,372 B2 * | 2/2009 | Crabtree et al. | ............. | 709/217 |
| 7,512,678 B2 * | 3/2009 | Crabtree | ........... | G06F 17/30867 707/999.003 |
| 7,849,269 B2 * | 12/2010 | Sundarrajan | .......... | H04L 69/329 709/219 |

(Continued)

FOREIGN PATENT DOCUMENTS

WO    2011/106687 A1    9/2011

OTHER PUBLICATIONS

Jones & Brown, Context-Aware Retrieval for Ubiquitous Computing Environments (Springer-Verlag Berlin Heidelberg 2004), Mobile and Ubiquitous Info Access Ws, LNCS 2954, pp. 227-243.*

(Continued)

*Primary Examiner* — Bennett Sigmond
(74) *Attorney, Agent, or Firm* — Polsinelli LLP (57) ABSTRACT

Systems, methods, and non-transitory computer-readable storage media for mobile advertisement based on a context-switching context taxonomy. The system collects usage data associated with a device. Based on the usage data, the system determines a switching context channel and a switching context trend, wherein the switching context channel defines a user's movement through channel classifications, and wherein the switching context trend defines the user's activity over a period of time. Next, the system generates a classification model based on the switching context channel and the switching context trend. The system then books a campaign of invitational content based on the classification model.

21 Claims, 5 Drawing Sheets

(56) References Cited

U.S. PATENT DOCUMENTS

| | | | |
|---|---|---|---|
| 7,853,475 B2* | 12/2010 | Deaton | G06Q 30/02 705/14.42 |
| 8,041,717 B2 | 10/2011 | Ramer et al. | |
| 8,060,507 B2* | 11/2011 | Alspector et al. | 707/731 |
| 8,086,489 B2* | 12/2011 | Ramakrishna | 705/14.4 |
| 8,156,135 B2* | 4/2012 | Chi | G06F 17/30864 707/765 |
| 8,370,362 B2 | 2/2013 | Szabo | |
| 8,447,652 B2* | 5/2013 | Watfa | G06Q 30/0255 705/14.64 |
| 8,549,629 B1 | 10/2013 | McCreesh | G06F 21/316 726/22 |
| 8,775,391 B2* | 7/2014 | Kalavade | 707/694 |
| 8,913,066 B2* | 12/2014 | Okuda | G01S 7/04 345/520 |
| 9,075,883 B2* | 7/2015 | Verkasalo | G06F 17/30867 |
| 2002/0107735 A1* | 8/2002 | Henkin | G06F 17/30899 705/14.55 |
| 2002/0128908 A1* | 9/2002 | Levin | G06Q 30/02 705/14.53 |
| 2002/0161767 A1* | 10/2002 | Shapiro | G06F 17/3089 |
| 2003/0033370 A1* | 2/2003 | Trotta | G06F 17/30730 709/204 |
| 2004/0039814 A1* | 2/2004 | Crabtree | G06F 17/30867 709/224 |
| 2004/0215515 A1* | 10/2004 | Perry | G06Q 30/02 705/14.54 |
| 2005/0240608 A1* | 10/2005 | Jones | G06F 17/30324 |
| 2005/0262005 A1 | 11/2005 | Woolston | |
| 2006/0069610 A1* | 3/2006 | Rossini | G06F 17/3089 705/14.54 |
| 2006/0195660 A1* | 8/2006 | Sundarrajan | H04L 69/327 711/118 |
| 2007/0015464 A1* | 1/2007 | Disalvo | G06Q 30/02 455/41.1 |
| 2007/0022384 A1* | 1/2007 | Abbott | G06F 1/163 715/744 |
| 2007/0112765 A1* | 5/2007 | Vishik | G06F 17/30734 |
| 2007/0124201 A1* | 5/2007 | Hu et al. | 705/14 |
| 2007/0244750 A1* | 10/2007 | Grannan | G06Q 30/02 705/14.64 |
| 2008/0004954 A1* | 1/2008 | Horvitz | G06Q 30/02 705/14.49 |
| 2008/0059571 A1* | 3/2008 | Khoo | G06Q 30/02 709/203 |
| 2008/0147484 A1* | 6/2008 | Davis | G06Q 30/02 705/14.53 |
| 2008/0201206 A1* | 8/2008 | Pokorney | G06F 17/30867 705/7.29 |
| 2009/0055267 A1* | 2/2009 | Roker | G06F 17/3089 705/14.1 |
| 2009/0198507 A1* | 8/2009 | Rhodus | 705/1 |
| 2009/0210476 A1* | 8/2009 | Levy | G06Q 90/00 709/201 |
| 2009/0248680 A1* | 10/2009 | Kalavade | G06Q 30/0267 |
| 2009/0254824 A1* | 10/2009 | Singh | G01C 21/3679 715/716 |
| 2010/0094710 A1* | 4/2010 | Ramakrishna | G06Q 30/02 705/14.64 |
| 2010/0106593 A1* | 4/2010 | Willars et al. | 705/14.41 |
| 2010/0241944 A1* | 9/2010 | Athsani | G06F 17/30241 715/230 |
| 2011/0251875 A1* | 10/2011 | Cosman | G06Q 10/087 705/7.31 |
| 2011/0251898 A1* | 10/2011 | Scott | G06Q 30/02 705/14.62 |
| 2012/0084248 A1* | 4/2012 | Gavrilescu | 706/52 |
| 2012/0089466 A1* | 4/2012 | Froloff | 705/14.71 |
| 2012/0089906 A1* | 4/2012 | Reeves | H04L 67/1095 715/255 |
| 2012/0123988 A1* | 5/2012 | Kim | G06N 5/04 706/46 |
| 2012/0203625 A1 | 8/2012 | Soloff | |
| 2012/0221404 A1* | 8/2012 | Ahmed et al. | 705/14.39 |
| 2012/0309430 A1* | 12/2012 | Ayalur | G01S 5/0252 455/456.6 |
| 2013/0060631 A1* | 3/2013 | Corson | G06Q 30/0241 705/14.46 |
| 2013/0085886 A1* | 4/2013 | Satish | G06Q 30/02 705/26.7 |
| 2013/0144717 A1* | 6/2013 | Williams et al. | 705/14.53 |
| 2013/0290886 A1* | 10/2013 | Chen | G06F 3/0482 715/768 |
| 2014/0049473 A1* | 2/2014 | Higginson | G06F 3/0219 345/168 |
| 2014/0156659 A1* | 6/2014 | Grokop | H04M 1/72563 707/737 |
| 2014/0236333 A1* | 8/2014 | Perkuhn | H04N 21/4331 700/94 |
| 2014/0297407 A1* | 10/2014 | Sanghavi | G06Q 30/0255 705/14.53 |

OTHER PUBLICATIONS

Merriam-Webster's Collegiate Dictionary, 10th Ed (Merriam-Webster, 1998) at p. 1208.*

* cited by examiner

CONTEXT-SWITCHING TAXONOMY FOR MOBILE ADVERTISEMENT

TECHNICAL FIELD

The present technology pertains to mobile advertisements, and more specifically pertains to booking mobile advertisement campaigns based on a context-switching taxonomy.

BACKGROUND

Advertisers who book campaigns on mobile advertising networks use the same channel (category) classifications to run their advertisements as those used in desktop environments. In particular, advertising networks typically try to classify their supply (publisher inventory) into channels (categories or genres) according to their web properties to make it easy for advertisers to reserve inventory. While this approach works for matching booked demand to incoming supply in desktop browser environments, it is ineffective in mobile environments, as well as any other environment that differs from the desktop browser environment. This is primarily due to the differences in user behavior when browsing content in the mobile environment, as opposed to the desktop browser environment.

One example difference is the fast context switching that is common in the mobile environment. In the mobile environment, the user often moves from one "channel context" to another in a matter of seconds. Indeed, the user often switches contexts without even realizing that such a switch has been made. For example, the user can open an entertainment application, quickly switch to a finance application, and subsequently jump to a productivity application. The user can then continue switch to other, unrelated applications, such as a gaming application, a social network application, a utility application, etc. Here, the user moves through the different contexts within a few minutes or less. This fast context switching behavior makes the current channel-based taxonomy used for advertising in the desktop browser environment unsuitable for the mobile environment. For example, the channel-based taxonomy is suited for desktop browser environments where users slowly browse through different, but related, channels of content. Moreover, the channel-based taxonomy is generally ineffective in the mobile environment, as users in mobile environments rarely remain at a particular context long enough to build relevance and connections in that context.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for mobile advertisement based on a context-switching taxonomy. The system collects usage data associated with a device. The usage data can include what applications are used by the user at the device, when are the applications used by the user, how long does the user use each of the applications, how long does the user take to move from one application to another, etc. Moreover, the usage data can be for a period of time, such as an hour, a day, a week, a month, etc. However, at any time, the system can also extend the period of time to obtain usage data for a longer period of time.

Based on the usage data, the system then determines a switching context channel and a switching context trend, wherein the switching context channel defines a user's movement through channel classifications, and wherein the switching context trend defines the user's activity over a period of time. The system can also use the usage data to determine a switching context speed, a switching context time, and/or a switching context application. Here, the switching context speed can include a speed at which the user changes context, the switching context time can include the user's context behavior or the user's activity at a specific time, and the switching context application can include a frequency of use of an application by the user. Next, the system can generate a classification model based on the switching context channel and the switching context trend. In some embodiments, the classification model can also be based on the switching context speed, the switching context time, and/or the switching context application.

The classification model can include a context-switching taxonomy. Moreover, the classification model can classify invitational content from storage, and map the invitational content to content at the device based on the switching context channel, the switching context trend, the switching context speed, the switching context time, and/or the switching context application. The classification model can also classify invitational content from storage and map the invitational content to user activities at the device based on the switching context channel, the switching context trend, the switching context speed, the switching context time, and/or the switching context application. For example, the classification model can classify invitational content associated with email as productivity content and map the productivity content to applications launched in the morning at the device, based on a user's probability of interest in productivity content in the morning, as determined from the switching context time, the switching context trend, and/or the switching context application.

The system can then book a campaign based on the classification model. Here, the system can target invitational content to the device based on the switching context channel and the switching context trend. Moreover, the system can analyze and/or monitor the current context and/or the user's activities at the device, and select invitational content for the device based on the current context and/or the user's activities. The current context can include, for example, an activity of the user at the device, an input, a current time and/or date, a current location, a currently used application, content currently accessed at the device, a topic, a schedule, an agenda, a user's behavior, characteristics associated with the user's usage of the device and/or any content thereof, a user's movement through content and/or applications at the device, and/or any characteristics associated with content and/or application(s) used by the user at the device.

The invitational content in the classification model can be classified based on the switching context channel and the switching context trend. However, in some cases, the invitational content in the classification model can also be classified based on the switching context speed, the switching context time, and/or the switching context application. Thus, the system can target invitational content to the device that is classified according to any of these data points.

After booking the campaign of invitational content, the system can deliver invitational content to the device based on the campaign. Moreover, the system can continue to target invitational content as the user continues to use the device. Further, the system can deliver new invitational content to the device after an event, such as a context switch, and/or a period of time, such as 10 minutes. The system can also extend a session of invitational content even after the user switches context. In some cases, the system can select a sequence of invitational content and deliver multiple items of invitational content in a specific sequence and/or order. The system can select/determine the specific items of invitational content as well as the specific sequence and/or order of the items of invitational content based on any of the above context-switching data points.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a context-switching taxonomy for mobile advertisement. A system, method and computer-readable media are disclosed which provide a context-switching taxonomy for mobile advertisement. A brief introductory description of an exemplary configuration of devices and a network is disclosed herein. A more detailed description of a classification model and a context-switching taxonomy will then follow. These variations shall be described herein as the various embodiments are set forth. The disclosure now turns to FIG. 1.

Figure 1:
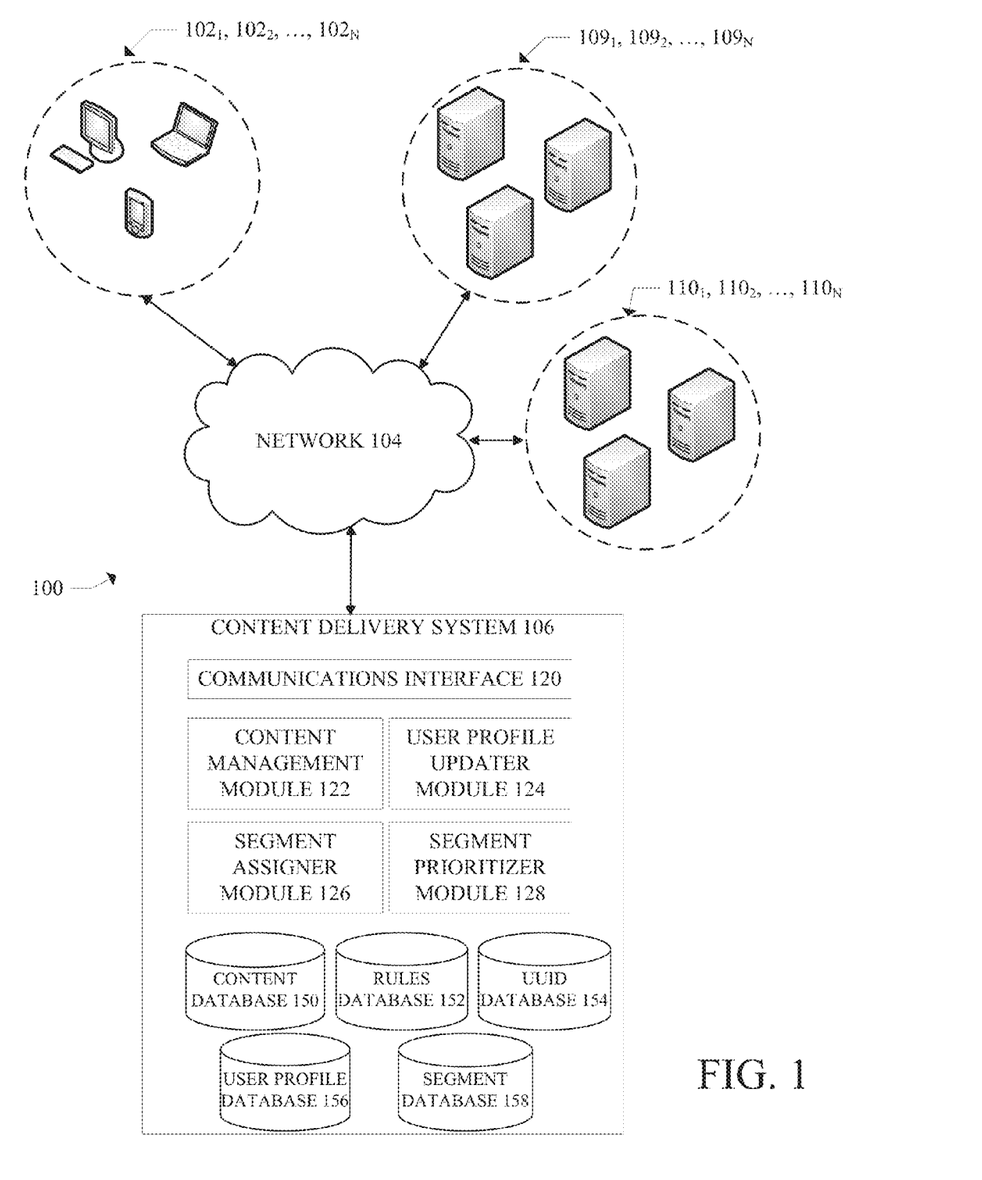
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, . . . , $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, . . . , $109_n$ (collectively "109") and content from one or more secondary content providers $110_1$, $110_2$, . . . $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app. As used herein, the terms "app", "software application", "application", and the like, refers to one or more portions of computer software designed to cause the user terminal to perform one or more specific tasks. Such tasks can include tasks beyond the running of the user terminal. However, the present disclosure contemplates that tasks performed by an app can also include tasks for running the user terminal.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a pre-defined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

Context-switching characteristics can define information about the user's context, application usage, activities, behavior, patterns, app switching characteristics, app channel switching characteristics, app switching speed characteristics, app switching trend characteristics, app switching time characteristics, and so forth. Context-switching characteristics can be used to target invitational content to the user and/or device. A context can include, for example, a set of characteristics associated with an interval of time. Moreover, context can be based on app switching characteristics, app switching speed characteristics, app switching channel characteristics, app switching trend characteristics, app switching time characteristics, characteristics of interactions with one or more apps, device characteristics, network characteristics, geolocation characteristics, characteristics of content interactions, characteristics of user behavior, characteristics of user activity, a time and/or date, etc. The content delivery system 106 can monitor and/or tract the context over a period of time, including the activity and/or changes in context at the user's device. The content delivery system 106 can then use the context to select invitational content in order to provide targeted content to the user.

In some embodiments, the content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

The disclosure now turns to a discussion of invitational content in mobile environments. When targeting invitational content, the user's behavior and/or activities can provide important information about the user. This information can then be used to define the particular invitational content and delivery options best suited for the user. Moreover, the user's behavior in a specific computing environment can provide information unique to that specific computing environment, which can help more accurately target invitational content for that specific computing environment. Indeed, the user's behavior in a desktop browser environment may provide an ineffective model for targeting invitational content in a mobile environment, as a user's behavior in a mobile environment is generally different than the user's behavior in a desktop browser environment. For example, users in desktop environments usually browse channels of web content in a steady, consistent, and largely predictable manner. By contrast, users in mobile environments often move from one channel context to another in a matter of seconds. This fast context switching can be erratic. In fact, within a matter of minutes, users in mobile environments frequently move through several, unrelated applications. For example, the user can open an entertainment application, briefly look at the application, and quickly switch to a finance application. The user may subsequently jump to a productivity application, and finish the session by playing a gaming application. This fast context switching behavior makes the current channel-based models used for targeting invitational content in the desktop browser environment unsuitable for the mobile environment, as users in mobile environments rarely remain at a particular channel long enough to build relevance and connections in that channel.

Figure 2:
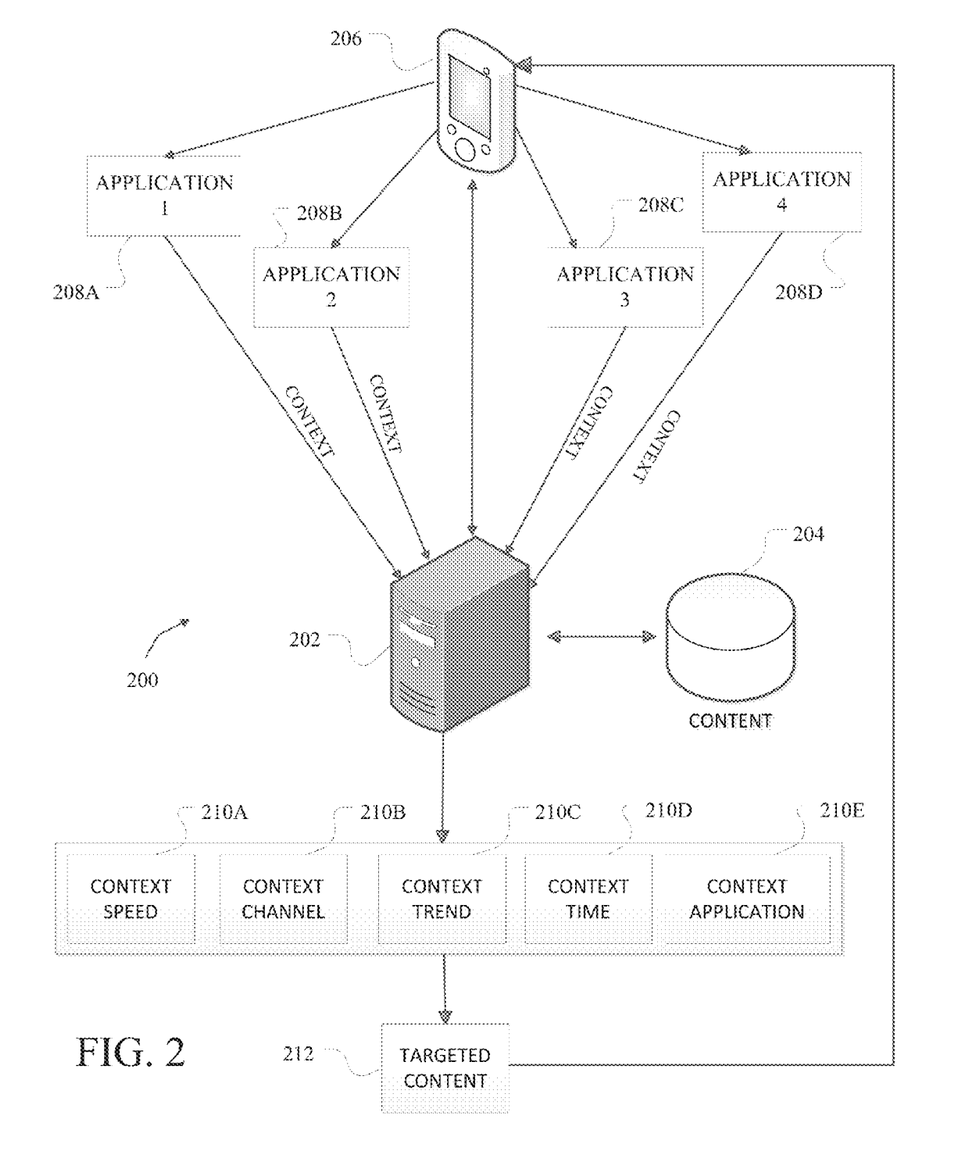
FIG. 2 illustrates an example configuration for targeting content based on context-switching data points.

Given the fast context switching behavior of users in mobile environments, a context-switching taxonomy or classification model can be used to more accurately and effectively target invitational content to users in mobile environments. FIG. 2 illustrates an example configuration 200 for targeting content based on context-switching data points. Here, system 202 and content storage 204 can be implemented using the components of the content delivery system of FIG. 1. Alternatively, components for either of system 202 and content storage 204 can be external to the content delivery system of FIG. 1, and can include components in various locations, including the user's device. As further described below, the context-switching data points can be used to generate a context-switching taxonomy and/or classification model for targeting invitational content to users in mobile environments, as well as any other environment. While the concepts disclosed herein are discussed in terms of mobile environments, the present disclosure contemplates extending these concepts to targeting invitational content in other environments, such as desktop environments, for example.

In FIG. 2, system 202 can monitor the context at device 206 over a period of time to determine data points 210A-E for targeting content to the device 206. The context can include, for example, an activity of the user at device 206, a user input, a time and/or date, a location of device 206, an app used by the user at device 206, content currently accessed at device 206, a topic, a schedule, an agenda, a user's behavior, characteristics associated with the user's usage of device 206 and/or any content thereof, a user's movement through content and/or apps at device 206, and/or any characteristics associated with content and/or apps used by the user at device 206. System 202 can monitor the activity and/or usage of apps 208A-D at device 206, and generate data representing the context at device 206 over a period of time. From the data representing the context at device 206, system 202 can generate data points 210A-E, which the system 202 can use as input for selecting invitational content from the content storage 204, and generating targeted content 212 for device 206. System 202 can then deliver the targeted content 212 to device 206 as part of a campaign of invitational content. Although shown as a separate component in FIG. 2, content storage 204 can be located external or internal to system 202.

The data points 210A-E can include a switching context speed 210A, a switching context channel 210B, a switching context trend 210C, a switching context time 210D, and/or a switching context app 210E. However, these data points are provided by way of example and not by way of limitation. That is, the present disclosure contemplates that the generating of targeted content can include more or less data points than illustrated in FIG. 2.

As noted above, the system 202 can utilize the data points 210A-E to generate the targeted content 212 for device 206. Accordingly, the present disclosure now turns to a description of how system 202 can use data points 210A-E in this regard. However, although the following description describes specific examples of how system 202 can utilize each of data points 210A-E and specific combinations thereof, the present disclosure also contemplates that the data points 210A-E can be combined with each other in ways that are not described below or with other data points not shown in FIG. 2 to generate the target content 212.

The switching context speed data point 210A can include data representing the speed at which the user at device 206 changes context. In other words, the switching context speed data point 210A can include data representing how fast the user at device 206 moves between the apps 208A-D at device 206. System 202 can detect when each of the apps 308A-D were launched and terminated. From this information, system 202 can determine the switching context speed at device 206 by calculating the speed/time at which the user moved between the apps 208A-D at device 206. The measure can be, for example, in number of apps over units of time. System 202 can then use the switching context speed data point 210A to determine the length of time for presenting invitational content at device 206. For example, depending on the switching context speed data point 210A, system 202 can determine that an invitational content campaign which started with one app (e.g., application 1) in a sequence of apps used (e.g., applications 1-4), can be extended into the next app (e.g., application 2) in the sequence of apps. Thus, a user may see an advertisement for a bank when using a finance app on device 206, and system 202 can cause the user to continue to see the advertisement for the bank when the user launches the next app, even if it is an app that is unrelated to banking, such as a gaming app, for example. System 202 can also use the switching context speed data point 210A to promote non-guaranteed advertisements over guaranteed advertisements, as non-guaranteed advertisements are more likely than guaranteed advertisements to be driven by cost-per-click (CPC). System 202 can also use the switching context speed data point 210A to organize and/or order advertisements. For example, system 202 can use the switching context speed data point 210A to queue-up the next set of advertisements, which may be, for example, from campaigns that are meeting their performance goals, such as their key performance indicators (KPI) goals, but may be falling short on delivery. Moreover, system 202 can use the switching context speed data point 210A to select a creative type over another (e.g., rich media vs. tap to web). The switching context speed data point 210A can also provide many additional benefits for selecting and/or delivering invitational content. For example, an advertiser can place a low cost-per-mile (CPM) bid on a potential advertisement conversion based on advertisements that can be pre-cached on the device 206. Then, when the user is in a fast context switching mode, the device 206 can elect to serve an advertisement from the local cache pool of advertisements without actually making a new advertisement request for the advertisement. This advertisement 'delivery' can be counted towards the overall delivery of the campaign, but at a different price, for example. The low CPM that the advertiser paid can be for a non-guaranteed placement. In the larger scheme of things, these extra, 'locally served advertisements' can add up, which can be a benefit to the advertising network, and can also give an advertisement conversion uptick for a low price, which can be a benefit to the advertiser.

The switching context channel data point 204B can include data representing a channel context mapping. In other words, the switching context channel data point 204B can include data mapping the channel or app categories used at device 206. For example, the data for the switching context channel data point 204B can represent the various classifications of channels used by the user at device 206. Accordingly, system 202 can utilize the switching context channel data point 204B to identify whether the user moved from one channel classification or app category to the same channel classification or app category, a similar channel classification or app category, or a different channel classification or app category. For example, if apps 1 and 2 (208A-B) are gaming apps, and apps 3 and 4 (208C-D) are productivity and utility apps, respectively, then the switching context channel data point 204B can include data identifying that the user moved from one app (gaming application 1) to another app of the same channel classification (gaming application 2), the user then moved to an app of a different channel classification (productivity application 3), and finally moved to an app of a similar channel classification (utility application 4). Thus, the data can identify that the user moved from a gaming channel classification, to another gaming channel classification, then to a productivity channel classification, and finally to a utility channel classification.

System 202 can then use the switching context channel data point 204B to adjust a campaign of invitation content based on the channel classifications identified from the user's activity at device 206. In some cases, system 202 can extend an advertisement session after the user closes an app and launches a new app of the same or similar classification or category, thus maintaining the same advertisement session throughout multiple app sessions of the same or similar classification or category. For example, if the user moves from a gaming app to another gaming app, system 202 can continue to present the previous advertising session (i.e., the advertising session associated with the first gaming app) to the user, instead of rotating a new advertisement in the second app launched in the sequence. Thus, the advertising session can be extended if the criteria defined via the switching context channel data point 204B is met. From the perspective of an advertisement server, the advertising impression count can be unique per app launched. Moreover, to the user, there is a perceived continuity in the advertisement, leading to overall greater conversion due to the persistence.

Moreover, system 202 can combine the switching context channel data point 204B with any of the data points 204A and 204C-E. For example, system 202 can combine the switching context channel data point 204B with the switching context speed data point 204A. Here, system 202 can utilize these data points to elect to serve "run of network" advertisements, which are not booked against any specific channel for users having a fast switch time and inconsistent channel context from one app to another. System 202 can also use the switching context channel data point 204B to select batch sequencing of advertisements, which can include a sequence of advertisements according to the user's channel classifications.

The switching context trend data point 204C can provide data representing app usage trends based on the user's behavior. The measurement for the switching context trend data point 204C is made over a period of time, such as a day or a week, for example. The switching context trend data point 204C can include data identifying a particular trend and/or characteristics associated with the trend in the user's behavior. For example, system 202 can monitor the usage of apps 208A-D at device 206 to identify trends, such as a sequence of apps used, a type of app used, a timing of use of apps, a length of use of apps, a number of apps used, etc. To illustrate, the switching context trend data point 204C can include data identifying a pattern of use of productivity apps in the morning, such as email apps, a pattern of app hopping behavior in the afternoon, and a pattern of use of gaming apps at night. These patterns can suggest that the user tends to access his email in the mornings and play different gaming apps at night. These patterns can also suggest that the user's behavior in the afternoon tends to be more erratic. Thus, system 202 can then use this information from the switching context trend data point 204C to determine an appropriate sequence and/or order of invitational content for the user. For example, system 202 can queue-up an appropriate set of invitational content for the user based on information about user trends included in the switching context trend data point 204C.

System 202 can combine the switching context trend data point 204C with any other data point in order to generate the targeted content 212. For example, system 202 can combine the switching context trend data point 204C with the switching context channel data point 204B to identify an appropriate sequence of invitational content to show the user, irrespective of the actual apps being launched at device 206. For example, some users may spend more time using productivity apps than other apps. Here, system 202 can present the user at device 206 with invitational content booked against the productivity channel, even if the user's current context is a gaming app, for example. This way, system 202 can target invitational content for the user that is more likely to comport with the user's interest and/or usage. When using the switching context trend data point 204C to target invitational content for the user, system 202 can also combine multiple trends. For example, system 202 can combine a user's trend of using productivity apps in the morning with a user's trend of using financial apps on Fridays, in order to target invitational content related to financial productivity apps for presentation to the user on Friday mornings.

The switching context time data point 204D can include data that indicates the user's app usage behavior at specific times. For many smartphone users, there are specific intervals during the day when their device usage may be quick and somewhat erratic (from a context switching perspective). The data in the switching context time data point 204D can identify those intervals, and system 202 can adapt the targeted content delivery to exclude or target those intervals. Accordingly, system 202 can adapt the delivery of content to prevent content from being delivered during times when the user's behavior is quick and erratic, as identified by the switching context time data point 204D. Moreover, system 202 can combine this data point with any other data point(s). For example, system 202 can combine the switching context time data point 204D with the switching context speed data point 204A to setup exclusions for serving content. The exclusions can prevent advertisements from being shown in times where the user may not have sufficient time or motivation to engage with invitational content.

The switching context app data point 204E can provide data representing information about the user's usage frequency of one or more apps. In particular, the data in the switching context app data point 204E can identify categories of frequently used apps and/or infrequently used apps. For example, smartphone users typically have many apps installed on their smartphone, but frequently use the same set of few apps, and rarely use the rest of the apps installed on their smartphone. For the rarely used apps identified via the switching context app data point 204E, system 202 can fold their channel classification into the frequently used apps category. Thus, the user's advertisement exposure can remain consistent in all apps regardless of which current context of infrequently used app they are in at the moment the advertisement is served.

System 202 can use the data points 210A-E to generate a context-switching taxonomy. The context-switching taxonomy can include a list, a tree, a hierarchy, a matrix, facets, a map, a graph, a table, a database, a model, etc. Moreover, the context-switching taxonomy can classify various aspects of the user's context according to the data points 210A-E. For example, the context-switching taxonomy can classify app usage trends, app channels, app switching speed, app time of use, app frequency of use, app usage patterns, user's activity, etc. For example, the context-switching taxonomy can define what apps are used by the user, when has the user launched and/or terminated one or more apps, what is the app usage characteristics at an interval of time, etc.

The context-switching taxonomy can also model the various aspects of the user's context and/or activities. In addition, the context-switching taxonomy can form relationships between different levels of classifications in the model. In particular, the context-switching taxonomy can classify invitational content and match or map the invitational content to apps and/or pages. Here, the invitational content can be mapped to the apps and/or pages based on context information and/or attributes from the data points 210A-E. This way, the context-switching taxonomy can classify invitational content and map the invitational content to specific characteristics/attributes of the various contexts of the user over a period of time. For example, if the data points 210A-E indicate that the user mostly uses productivity apps in the morning, the context-switching taxonomy can include a classification of productivity content mapped to all apps launched by the user in the morning, in order to ensure that the invitational content delivered to the user in the mornings comports with what the user may expect to receive and/or is interested in receiving. As another example, if the switching context speed data point 210A and/or any other data points indicate that the user tends to quickly and erratically move through apps in the afternoon, the context-switching taxonomy can include a classification of invitational content mapped to sequences of apps launched by the user in the afternoon, in order to ensure that the same invitational content is delivered to the user over a sequence of multiple apps, to increase the user's exposure to the invitational content even when the user behaves erratically.

System 202 can use the context-switching taxonomy to target invitational content. For example, when the user launches an app, system 202 can determine the user's context and select/generate invitational content to present to the user based on the context-switching taxonomy. Thus, if the user launches an app in the morning, system 202 can select invitational content that is mapped to the app when launched in the morning according to the context-switching taxonomy. For example, if the data points 210A-E indicate that the user typically uses a sequence of gaming apps at night, the context-switching taxonomy can include a classification of gaming invitational content mapped to gaming apps. The context-switching taxonomy can further specify that at least a portion of the gaming invitational content should be delivered to the user as a sequence of gaming advertisements when the user's context is a gaming app at night. Thus, when the user launches a gaming app at night, system 202 can select the sequence of gaming advertisements from the context-switching taxonomy to be delivered to the user. Moreover, the context-switching taxonomy can be implemented for, among other things, inventory forecasting, booking campaigns, building creatives (e.g., creative appropriate for the context), reporting, etc.

Figure 3:
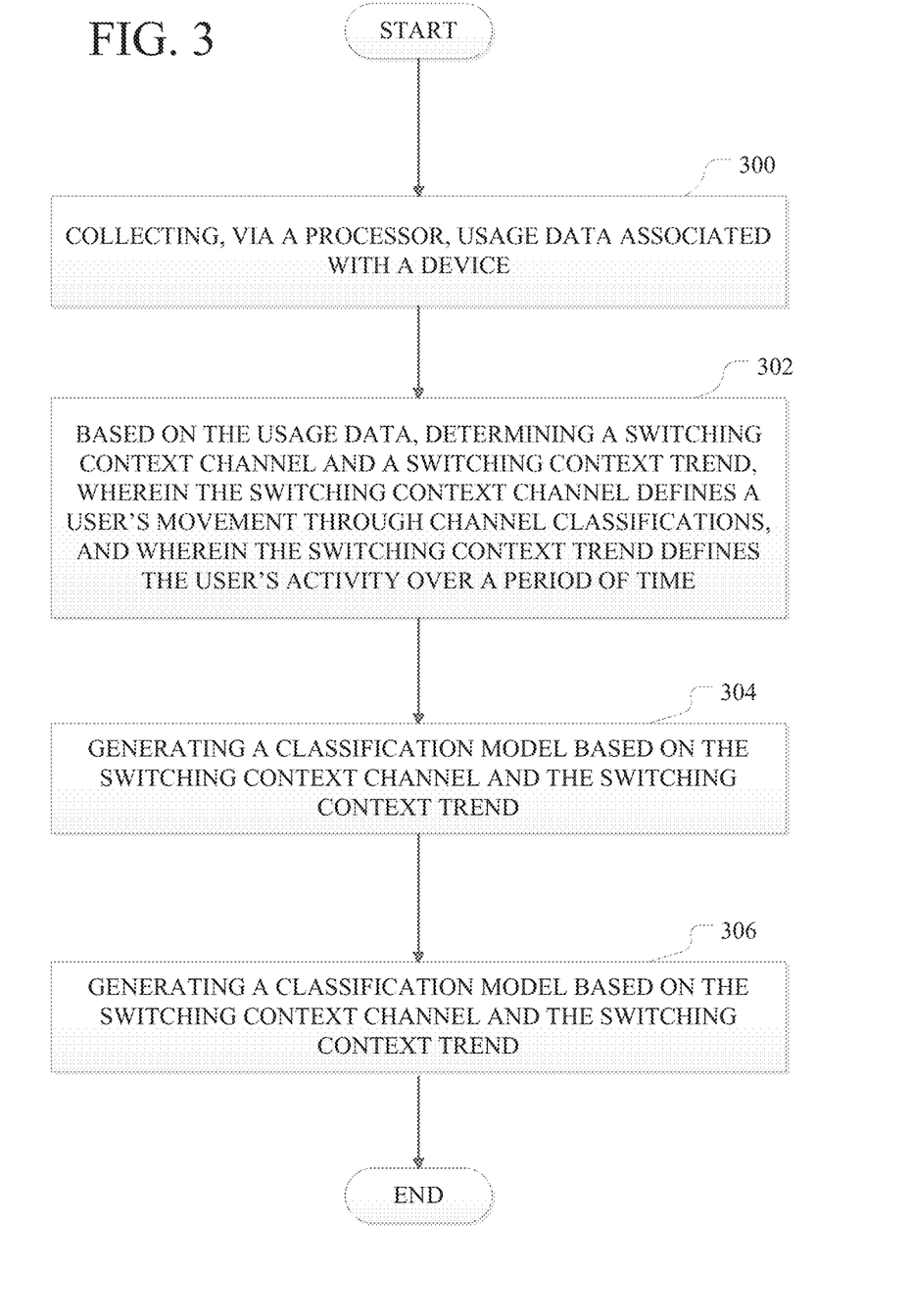
FIG. 3 illustrates a first example method embodiment.

Having disclosed some basic system components and concepts, the disclosure now turns to the exemplary method embodiment shown in FIG. 3. For the sake of clarity, the method is described in terms of the content delivery system 106, as shown in FIG. 1, configured to practice the method. The steps outlined herein are exemplary and can be implemented in any combination thereof, including combinations that exclude, add, or modify certain steps.

FIG. 3 illustrates a first example method embodiment. The content delivery system 106 terminal $102_i$ (300). The content delivery system 106 can receive the usage data from terminal $102_i$. In some cases, the content delivery system 106 can otherwise monitor a user's activity at terminal $102_i$ in order to obtain the usage data. The usage data can include what apps are used by the user at terminal $102_i$, when are the apps used by the user, how long does the user use each of the apps, how long does the user take to move from one app to another, etc. Moreover, the usage data can be for a period of time, such as an hour, a day, a week, a month, etc. The content delivery system 106 can also extend the period of time to obtain usage data for a longer period of time.

Based on the usage data, the content delivery system 106 then determines a switching context channel and a switching context trend, wherein the switching context channel defines a user's movement through channel classifications, and wherein the switching context trend defines the user's activity over a period of time (302). The content delivery system 106 can also use the usage data to determine a switching context speed, a switching context time, and/or a switching context app. Here, the switching context speed can include a speed at which the user changes context, the switching context time can include the user's context behavior or the user's activity at a specific time, and the switching context app can include a frequency of use of one or more apps by the user. Next, the content delivery system 106 can generate a classification model based on the switching context channel and the switching context trend (304). In some embodiments, the classification model can also be based on the switching context speed, the switching context time, and/or the switching context app.

The classification model can include a context-switching taxonomy, such as the context-switching taxonomy detailed above with respect to FIG. 2. In some embodiments, the classification model can classify invitational content from the content database 150, and map the invitational content to content at terminal $102_i$ based on the switching context channel, the switching context trend, the switching context speed, the switching context time, and/or the switching context app. The classification model can also classify invitational content from the content database 150, and map the invitational content to user activities at terminal $102_i$ based on the switching context channel, the switching context trend, the switching context speed, the switching context time, and/or the switching context app. For example, the classification model can classify invitational content associated with games as gaming content and map the gaming content to the user's act of launching a gaming app. As another example, the classification model can classify invitational content associated with email as productivity content and map the productivity content to apps launched in the morning at terminal $102_i$, based on a user's probability of interest in productivity content in the morning, as determined from the switching context time, the switching context trend, and/or the switching context app.

Next, the content delivery system 106 can book a campaign based on the classification model (306). Here, the content delivery system 106 can target invitational content to terminal $102_i$ based on the switching context channel and the switching context trend. The content delivery system 106 can analyze and/or monitor the current context at terminal $102_i$ and select invitational content for terminal $102_i$ from the content database 150 based on the current context. The current context can include, for example, an activity of the user at terminal $102_i$, a user input, a current time and/or date, a current location, a currently used app, content currently accessed at terminal $102_i$, a topic, a schedule, an agenda, a user's behavior, characteristics associated with the user's usage of terminal $102_i$ and/or any content thereof, a user's movement through content and/or apps at terminal $102_i$, and/or any characteristics associated with content and/or app(s) used by the user at terminal $102_i$. The content delivery system 106 can obtain information about the current context at terminal $102_i$, and target invitational content to terminal $102_i$ by selecting invitational content from the content database 150 matching one or more characteristics of the current context according to a classification of the invitational content within the classification model.

The invitational content in the classification model can be classified based on the switching context channel and the switching context trend. However, in some cases, the invitational content in the classification model can also be classified based on the switching context speed, the switching context time, and/or the switching context app. Thus, the content delivery system 106 can target invitational content to terminal 102$_i$ that is classified according to any of these data points. To illustrate, if the content delivery system 106 determines that the current context at terminal 102$_i$ includes a gaming app being used at night, the content delivery system 106 can select invitational content from the content database 150 that is classified in the classification model as corresponding to night and/or gaming app contexts. For example, if the switching context trend indicates that the user at terminal 102$_i$ tends to use social apps at night, the content delivery system 106 can target invitational content related to social apps to the user, as the user may be more receptive to content related to social apps at night.

After booking the campaign of invitational content, the content delivery system 106 can deliver invitational content to terminal 102$_i$ based on the campaign. The content delivery system 106 can continue to target invitational content, as the user continues to use terminal 102$_i$. For example, the content delivery system 106 can rotate and/or deliver new invitational content to terminal 102$_i$ after a period of time. In some cases, the content delivery system 106 can select a sequence of invitational content from the content database 150 and deliver multiple items of invitational content in a specific sequence and/or order. The content delivery system 106 can select/determine the specific items of invitational content, as well as the specific sequence and/or order of the items of invitational content, based on any of the above context-switching data points. For example, if the user at terminal 102$_i$ typically uses productivity apps followed by news apps, as determined by the context switching channel and/or the context switching trend, the content delivery system 106 can select a sequence of productivity content followed by news content to deliver to terminal 102$_i$. This way, the content delivery system 106 can target invitational content to terminal 102$_i$ that matches the typical usage of apps by the user at terminal 102$_i$.

As another example, if the context switching speed data point indicates that the user's behavior at terminal 102$_i$ is erratic in the mornings, the content delivery system 106 can select an order of invitational content to deliver to terminal 102$_i$ where one or more items of invitational content are maintained at terminal 102$_i$ even after the user moves through different apps. In this sense, the delivery of invitational content would not mimic the user's erratic behavior. This can be an intentional targeting decision/selection intended to increase the user's exposure to the invitational content. Thus, when the user at terminal 102$_i$ switches context, the content delivery system 106 can elect to maintain a session of invitational content or update/change the session of invitational content based on the classification model.

Figure 4:
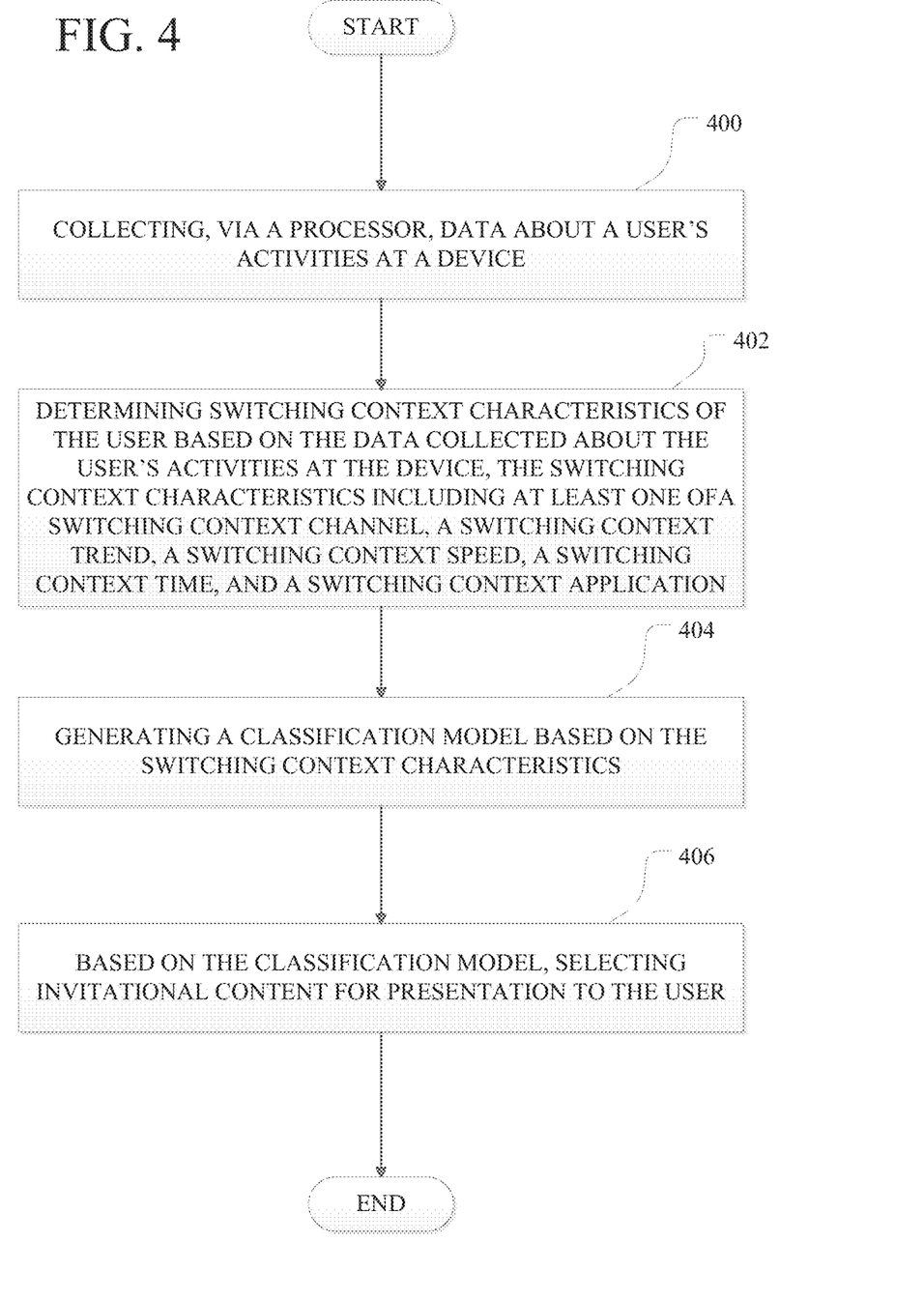
FIG. 4 illustrates a second example method embodiment.

The disclosure now turns to the exemplary method embodiment shown in FIG. 4. For the sake of clarity, the method is described in terms of terminal 102$_i$ as shown in FIG. 1, configured to practice the method. The steps outlined herein are exemplary and can be implemented in any combination thereof, including combinations that exclude, add, or modify certain steps.

FIG. 4 illustrates a second example method embodiment. Terminal 102$_i$ can first collect data about a user's activities at terminal 102$_i$ (400). The data can include the user's current context. The current context can include, for example, a current time and/or date, a current location, an app currently used at terminal 102$_i$, content currently accessed at terminal 102$_i$, a topic, a schedule, an agenda, an input, a user's behavior, characteristics associated with the user's usage of terminal 102$_i$ and/or any content thereof, a user's movement through content and/or apps at terminal 102$_i$, and/or any characteristics associated with content and/or app(s) used by the user at terminal 102$_i$. To obtain the data about the user's activities, terminal 102$_i$ can track, monitor, analyze, log, and/or process the user's activities at the terminal.

Terminal 102$_i$ can then determine switching context characteristics of the user based on the data collected about the user's activities at terminal 102$_i$, the switching context characteristics including a switching context channel, a switching context trend, a switching context speed, a switching context time, and/or a switching context app (402). The switching context channel can include data defining a user's movement through channel classifications. The switching context trend can include data defining the user's activity over a period of time. The switching context speed can include a speed at which the user changes context and/or activities. The switching context time can include the user's context behavior or activities at a specific time. Finally, the switching context app can include a frequency of use of one or more apps by the user.

Next, terminal 102$_i$ can generate a classification model based on the switching context characteristics (404). In particular, terminal 102$_i$ can generate the classification model based on the switching context channel, the switching context trend, the switching context speed, the switching context time, the switching context app, and/or any other data point. The classification model can classify invitational content according to any of the data points described above. For example, the classification model can map invitational content to apps and/or content at terminal 102$_i$ based on the switching context characteristics associated with terminal 102$_i$. Moreover, the classification model can be, for example, a context-switching taxonomy, such as the context-switching taxonomy described in FIG. 2 above.

Based on the classification model, terminal 102$_i$ then selects invitational content for presentation to the user (406). Terminal 102$_i$ can select and retrieve the invitational content from the content database 150. However, in some embodiments, terminal 102$_i$ can select and retrieve the invitational content from a local storage, such as a local cache of invitational content, for example. Moreover, the terminal 102$_i$ can also select the invitational content based on the user's activities and/or current context at terminal 102$_i$. For example, terminal 102$_i$ can identify one or more characteristics associated with the user's activities and/or current context and select invitational content having a classification matching the one or more characteristics associated with the user's activities and/or current context. Terminal 102$_i$ can select items of invitational content based on respective classifications and/or categories associated with the items of invitational content within the classification model. In some embodiments, the classification model can be a context-switching taxonomy that terminal 102$_i$ uses to identify invitational content to present to the user based on the user's activities, the user's current context, and/or the probability of relevance and/or interest to the user. Here, terminal 102$_i$ can select a node, branch, category, and/or item in the context-switching taxonomy based on an algorithm that matches a corresponding item of invitational content with the user's activities, context, and/or interest, for example.

Terminal 102$_i$ can update the classification model as it collects additional data about the user's activities. Moreover, terminal 102$_i$ can supplement the classification model with external information, information inputted by a user, information associated with a channel-based taxonomy, etc. In addition, terminal 102$_i$ can extend and/or update a session of invitational content at terminal $102_i$ based on the classification model. For example, terminal $102_i$ can maintain a session of invitational content even as the user switches context and/or activities.

Figure 5A:
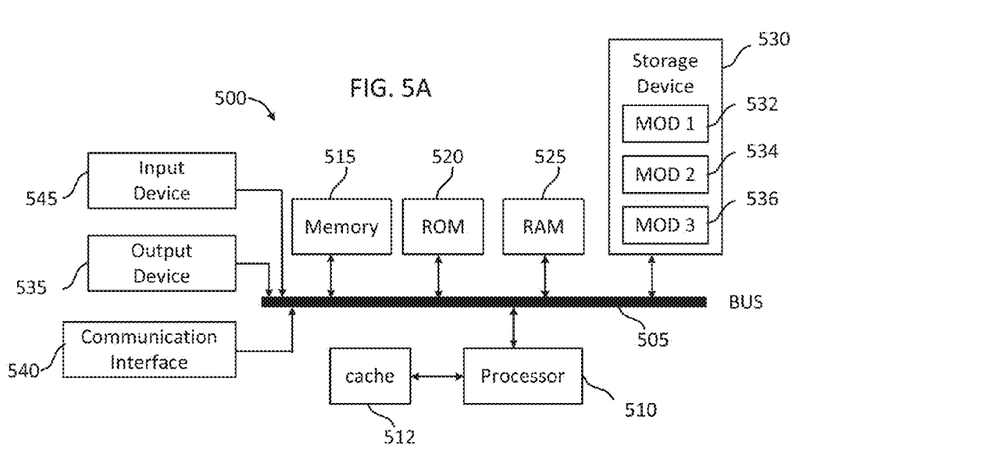
FIGS. 5A and 5B illustrate example system embodiments.
Figure 5B:
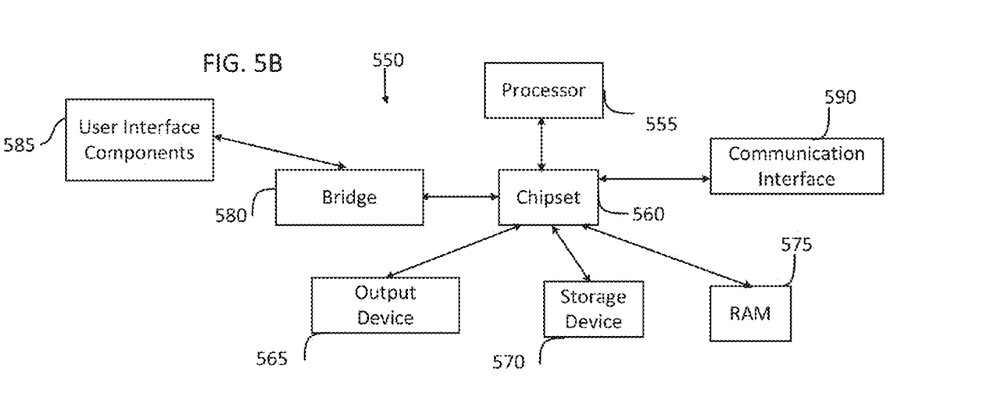

FIG. 5A and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures. Although a variety of examples and other information were used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim.

We claim:

1. A computer-implemented method comprising:
   collecting usage data associated with a device;
   based on the usage data, determining different applications accessed at the device during a period of time;
   detecting a speed at which the device switches between the different applications during the period of time;
   determining whether the speed is faster than a threshold speed;
   in response to determining that the speed is faster than the threshold speed, instructing the device to extend a current invitational content session when the device switches from a first application to a second application that is different than the first application; and
   in response to determining that the speed is slower than the threshold speed, instructing the device to switch from the current invitational content session to a different invitational content session when the device switches from the first application to the second application.

2. The method of claim 1, further comprising identifying respective application channels corresponding to each of the different applications accessed at the device during the period of time, wherein at least one of the current invitational content session or the different invitational content session are based on the respective application channels.

3. The method of claim 1, further comprising:
   based on the usage data, determining at least one from switching context time data and switching application frequency data, the switching context time data identifying time periods associated with a number of changes between the different applications at the device above a threshold number of application changes, and the switching application frequency data identifying a respective access frequency associated with the different applications; and
   generating a classification model based on at least one of the switching context time data and the switching application frequency data.

4. The method of claim 3, wherein the classification model comprises a context-switching taxonomy.

5. The method of claim 4, further comprising booking a campaign of invitational content based on the classification model and a channel-based taxonomy.

6. The method of claim 5, further comprising delivering at least one item of invitational content to the device, wherein the at least one item is selected based on the campaign of invitational content.

7. The method of claim 6, further comprising based on the classification model, transmitting instructions to the device to continue displaying the at least one item even after an active application at the device is changed.

8. The method of claim 1, wherein the current invitational content session comprises a presentation of a specific item of invitational content, and wherein the different invitational content session comprises a different presentation of a second specific item of invitational content.

9. The method of claim 1, further comprising transmitting instructions to the device to deliver new invitational content to the device when the user switches context, wherein the context comprises an activity.

10. The method of claim 1, further comprising booking a campaign of invitational content based on a classification model, the classification model being based on at least one of the different applications accessed at the device, the speed at which the device switches between different applications, and a switching context channel, wherein the campaign of invitational content comprises a sequence of mobile advertisements selected and ordered based on the classification model.

11. The method of claim 1, further comprising:
    based on the usage data, determining a switching context speed comprising the speed at which the device switches between the different applications;
    determining that the user is in a fast context mode based on a comparison of the switching context speed and a threshold value for invoking the fast context mode; and
    in response to the determining that the user is in the fast context mode based on the switching context speed and the threshold value, transmitting instructions to the device to deliver to the user invitational content selected from a local pool of invitational content.

12. The method of claim 11, wherein a delivery of the invitational content to the device is counted towards an overall delivery of a campaign of invitational content at a different price than other invitational content delivered to the device as part of the campaign of invitational content.

13. The method of claim 1, further comprising determining a context-switching taxonomy, wherein the context-switching taxonomy is implemented for at least one of forecasting, booking a campaign, building an advertisement creative, and targeting invitational content.

14. A non-transitory computer-readable medium storing instructions which, when executed by a processor, cause the processor to perform operations comprising:
    based on data collected about activities at a device, determining different applications accessed at the device during a period of time;
    detecting a speed at which the device switches between the different applications during the period of time;

determining whether the speed is faster than a threshold speed;

in response to determining that the speed is faster than the threshold speed, instructing the device to extend a current invitational content session when the device switches from a first application to a second application that is different than the first application; and in response to determining that the speed is slower than the threshold speed, instructing the device to switch from the current invitational content session to a different invitational content session when the device switches from the first application to the second application.

15. The computer-readable medium of claim 14, wherein the current invitational content session comprises a first delivery of a first item of invitational content and the different invitational content session comprises a second delivery of a second item of invitational content, the first item being different than the second item.

16. The computer-readable medium of claim 14, storing additional instructions which, when executed by the processor, result in operations further comprising:

instructing the device to present at least one invitational content item at the device; and based on the speed being faster than the threshold speed, instructing the device to continue displaying the at least one of the invitational content item at the device even after an active application at the device is changed.

17. The computer-readable medium of claim 14, storing additional instructions which, when executed by the processor, result in operations further comprising based on the speed being slower than the threshold speed, instructing the device to deliver new invitational content to the device when the user switches context, wherein the context comprises an activity.

18. The computer-readable medium of claim 14, storing additional instructions which, when executed by the processor, result in operations further comprising generating a classification model that classifies invitational content and maps the invitational content to content at the device based on switching context characteristics.

19. A system comprising:

a processor; and a computer-readable medium having stored therein instructions which, when executed by the processor, cause the processor to perform operations comprising:

receiving usage data associated with a device;

based on the usage data, determining different applications accessed at the device during a period of time;

detecting a speed at which the device switches between the different applications during the period of time;

determining whether the speed is faster than a threshold speed;

in response to determining that the speed is faster than the threshold speed, instructing the device to extend a current invitational content session when the device switches from a first application to a second application that is different than the first application; and in response to determining that the speed is slower than the threshold speed, instructing the device to switch from the current invitational content session to a different invitational content session when the device switches from the first application to the second application.

20. The system of claim 19, wherein the operations further comprise classifying and mapping invitational content to content at the device based on at least one of switching context channel data, switching context trend data, the speed at which the device switches between different applications, switching context time data, and switching application frequency data, the switching context time data identifying time periods associated with a number of changes between the different applications at the device above a threshold number of changes, and the switching application frequency data identifying a respective access frequency associated with the different applications.

21. The system of claim 19, the computer-readable medium storing additional instructions which, when executed by the processor, result in operations further comprising:

based on the usage data, determining at least one from switching context time data and switching application frequency data, the switching context time data identifying time periods associated with a number of changes between the different applications at the device above a threshold number of changes, and the switching application frequency data identifying a respective access frequency associated with each of the different applications; and generating a classification model based on at least one of the switching context time data, the speed at which the device switches between the different applications, and the switching application frequency data.

* * * * *